United States Patent
Moses

(10) Patent No.: US 6,742,955 B2
(45) Date of Patent: Jun. 1, 2004

(54) TIE ROD END WITH PURGATIVE GREASE ZERK AND PURGELESS TIE ROD BOOT

(75) Inventor: David G. Moses, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/964,228

(22) Filed: Sep. 26, 2001

(65) Prior Publication Data

US 2003/0059250 A1 Mar. 27, 2003

(51) Int. Cl.[7] ............................. F16C 11/00; F16D 1/12
(52) U.S. Cl. ..................... 403/122; 403/135; 403/132; 403/133; 403/141; 403/142; 403/143
(58) Field of Search ................... 403/135, 122, 403/165, 133, 134, 132, 141–143

(56) References Cited

U.S. PATENT DOCUMENTS

| | | | |
|---|---|---|---|
| 4,003,667 A | 1/1977 | Gaines et al. ................. | 403/36 |
| 4,076,344 A | 2/1978 | Gaines et al. ................. | 308/72 |
| 5,435,652 A | 7/1995 | Howard ........................ | 384/99 |
| 5,816,731 A | 10/1998 | Howard ...................... | 403/120 |
| 5,964,325 A | 10/1999 | Davison et al. ............. | 188/330 |
| 6,250,840 B1 * | 6/2001 | Urbach et al. .............. | 403/135 |
| 6,371,682 B1 * | 4/2002 | Maughan ................ | 403/165 X |

FOREIGN PATENT DOCUMENTS

| FR | 1399174 | 4/1965 |
|---|---|---|
| FR | 1598105 | 6/1970 |

* cited by examiner

Primary Examiner—John R. Cottingham
Assistant Examiner—Victor MacArthur
(74) Attorney, Agent, or Firm—Dykema Gossett PLLC

(57) ABSTRACT

A tie rod end having a purgative zerk for removal of used lubricants is provided. In one embodiment of the invention, the tie rod end includes a socket member that defines a first bore in which a ball stud member is disposed and a second bore in communication with the first bore. The purgative zerk is disposed in the second bore. In a second embodiment of the invention, the purgative zerk is disposed in a plug used to close one end of the first bore. The use and location of the purgative zerk enable purge holes to be eliminated from a boot seal disposed at one end of the first bore thereby reducing contamination of the tie rod end.

13 Claims, 2 Drawing Sheets

TIE ROD END WITH PURGATIVE GREASE ZERK AND PURGELESS TIE ROD BOOT

BACKGROUND OF THE INVENTION

1. Field of the Invention

This invention relates to tie rod ends and, in particular, to removal of lubricants from tie rod ends.

2. Disclosure of the Related Art

Tie rod ends form part of the steering linkage in a vehicle and are coupled to steering knuckles disposed at either end of a steer axle to enable the vehicle operator to steer wheels supported on the knuckles. A conventional tie rod end includes a socket member and a ball stud member, the ball stud member being disposed in the socket member. Lubricants are used to reduce friction and heat created by contact between the socket member and ball stud member. As the lubricants are exposed to such stresses, their composition begins to break down and the lubricants need to be removed and replaced. One conventional tie rod end uses purge holes in a boot seal surrounding the ball stud member to allow the removal of used lubricant. Another conventional tie rod end uses a valve with a flap in the boot seal to allow used lubricant to be purged from the tie rod end.

Conventional tie rod ends have several disadvantages. For example, the use of purge holes in a boot seal allows outside contaminants to enter the chamber defined in the socket member in which the ball stud member is disposed-particularly when the vehicle is in motion (whether such motion occurs during vehicle travel or when the vehicle is at rest and, for example, is being loaded or unloaded). The boot seal operates like a vacuum and absorbs outside contaminants. The use of a valve with a flap in the boot seal reduces the amount of contaminants entering the chamber, but increases the cost of the boot seal. Further the integrity of the valve flap can be compromised.

There is thus a need for a tie rod end that will minimize or eliminate one or more of the above-mentioned deficiencies.

SUMMARY OF THE INVENTION

The present invention provides a tie rod end for use with tie rods and steering assemblies.

A tie rod end in accordance with one embodiment of the present invention includes a socket member that defines a first bore at one end of the socket member and a second bore in communication with the first bore. The first and second bores may be disposed about axes perpendicular to each other. The tie rod end also includes a ball stud member, which includes a ball portion disposed within the first bore and a stud portion extending from the first bore. Finally, the tie rod end also includes a purgative zerk disposed in the second bore.

A tie rod end in accordance with a second embodiment of the invention includes a socket member defining a first bore proximate one end and a ball stud member including a ball portion disposed within the first bore and a stud extending from the first bore. The tie rod end also includes a plug that closes one end of the first bore in the socket member. Finally, the tie rod end includes a purgative zerk disposed in the plug.

A tie rod end in accordance with the present invention represents a significant improvement as compared to conventional tie rod ends. In particular, the use of a purgative zerk in either the socket or plug reduces the amount of outside contaminants that enter the tie rod end as compared to conventional tie rod ends. The use of a zerk in the socket or plug allows the use of a purgeless boot seal, which contains no holes and creates a hermetic seal.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
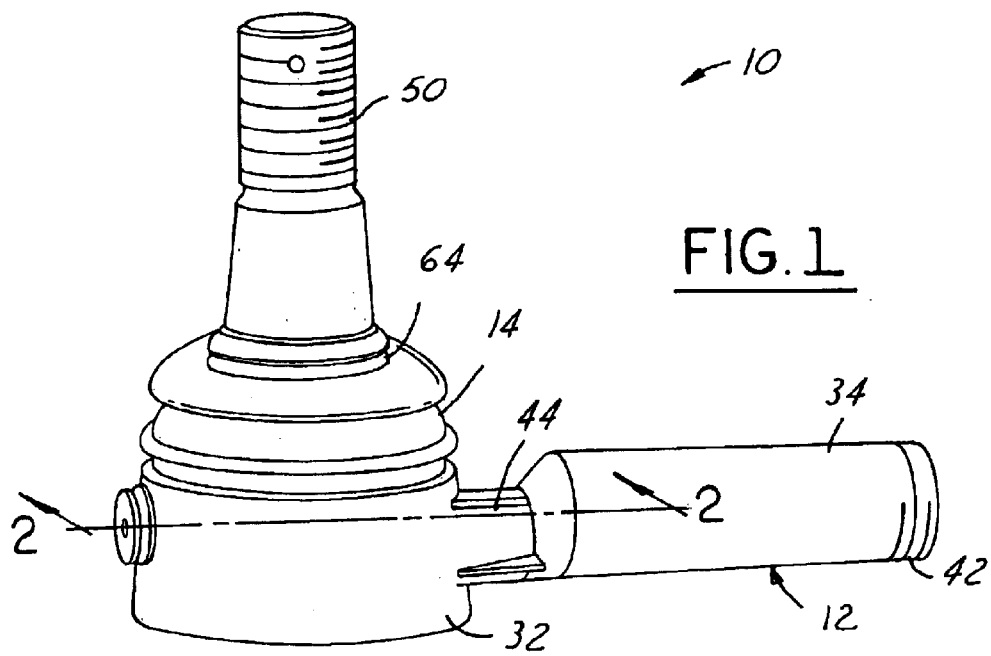
FIG. 1 is a perspective view of a first embodiment of a tie rod in accordance with the present invention.
Figure 2:
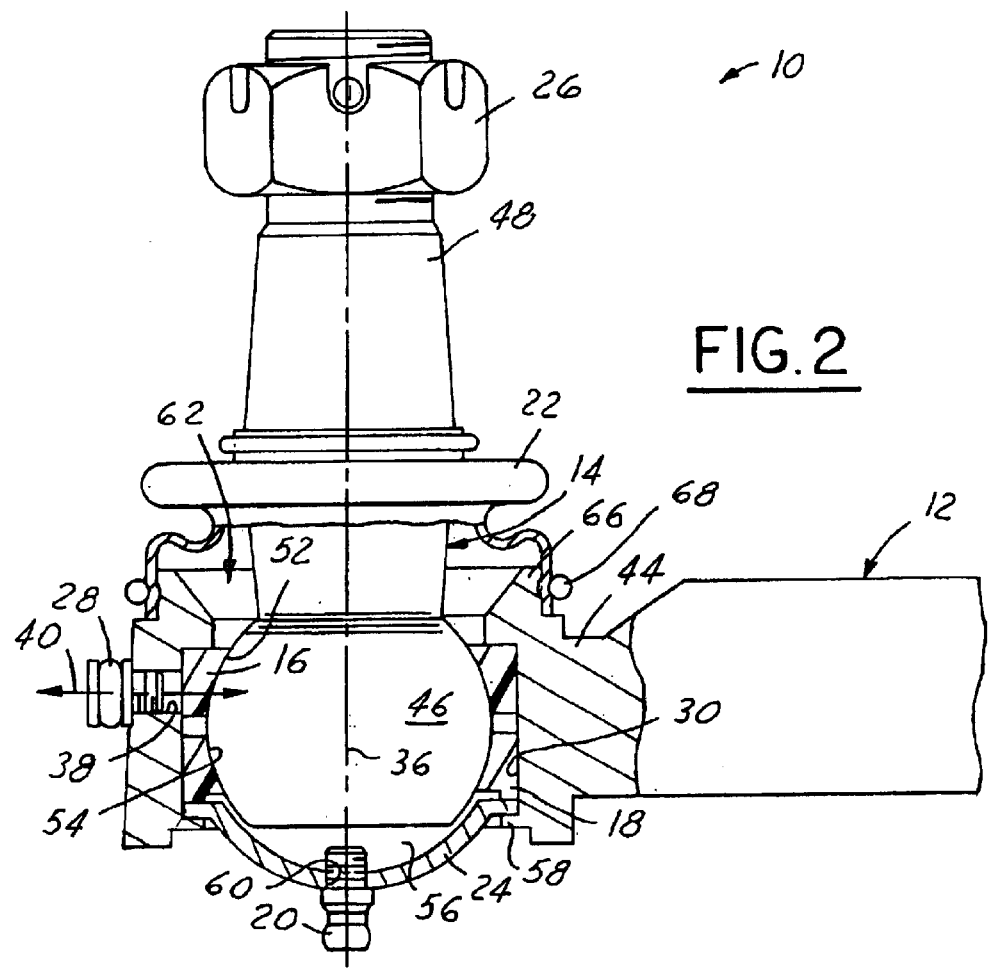
FIG. 2 is a sectional view of the tie rod of FIG. 1 taken along lines 2—2.

Referring now to the drawings wherein like reference numerals are used to identify identical components in the various views, FIGS. 1–2 illustrate one embodiment of a tie rod end 10 in accordance with the present invention. Tie rod end 10 is configured for use in a steering linkage in a vehicle. As is known in the art, end 10 may be disposed at one end of a tie rod and may be coupled to a tie rod arm extending from a steering knuckle disposed at one end of a steer axle. Tie rod end 10 may include a socket member 12, a ball stud member 14, bearing rings 16, 18, a plug 20, a boot seal 22, a grease fitting 24, a nut 26, and means, such as a purgative zerk 28, for allowing removal of lubricants from tie rod end 10.

Socket member 12 defines a bore 30 proximate one end and configured to receive ball stud member 14 and allow pivotal motion of ball stud member 14. Member 12 includes an annular portion 32 and a threaded shank 34 coupled to portion 32. Portion 32 may be generally cylindrical in shape—defining bore 30—and may be disposed about an axis 36. Portion 32 also defines a bore 38 in communication with bore 30. Bore 38 may be disposed about an axis 40 that is perpendicular to axis 36 and extends radially in portion 32 from an outer diameter of portion 32 to an inner diameter of portion 32. Shank 34 is coupled to portion 32 and may be integral therewith. Shank 34 may be solid or tubular in construction. Shank 34 may include a plurality of threads 42 at one end configured to be received in a tie rod (not shown) and a reduced diameter portion 44 at an opposite end coupled to annular portion 32. Socket member 12 is conventional in the art.

Ball stud member 14 couples a steering knuckle (not shown) to end 10 and enables relative movement of the steering knuckle and tie rod (not shown). Member 14 includes a ball portion 46 and a stud 48. Ball portion 46 is substantially spherical in design and is sized to be received within bore 30. Stud 48 extends from ball portion 46 and bore 30 and may be integral with ball portion 46. Stud 48 includes a plurality of threads 50 at one end and is configured to be received within an aperture defined in a tie rod arm of a steering knuckle (not shown). Ball stud member 14 is conventional in the art.

Bearing rings 16, 18 are provided to enable movement of ball stud member 14 relative to socket member and to absorb the frictional force of such movement. Rings 16, 18 are sized to be received within bore 30 and define spherical seats 52, 54, respectively, configured to receive ball portion 46 of ball stud member 14. Bearing rings 16, 18 are conventional in the art.

Plug 20 is provided to close one end 56 of bore 30 in socket member 12 to contain lubricant within tie rod end 10. Plug 20 is conventional in the art and is disposed about axis 36. Plug 20 may be generally semi-spherical in shape with a radially outwardly extending flange disposed about its circumference and sized to be received within bore 30 of socket member 12. Plug 20 may be held within bore 30 by a radially inwardly extending lip 58 formed in socket member 12. Plug 20 may include an aperture 60 configured to receive grease fitting 24.

Boot seal 22 is provided to close another end 62 of bore 30 in socket member 12 to contain lubricant within tie rod end 10. Seal 22 is conventional in the art and may be made from conventional materials capable of flexing to allow movement of ball stud member 14. Seal 22 is disposed about axis 36 and includes only a single aperture 64 that is centered about axis 36 and is configured to receive stud 48 of member 14 as stud 48 extends outwardly from bore 30. Unlike most conventional boot seals, boot seal 22 is purgeless. In other words, boot seal 22 does not contain purge holes used to purge lubricant from bore 30. Seal 22 may be held in place against a reduced diameter portion 66 of annular portion 32 of member 12 by a snap ring 68 or in other ways conventional in the art.

Grease fitting 24 is provided to allow the introduction of grease or another lubricant into bore 30. Fitting 24 is conventional in the art and may be disposed within aperture 60 of plug 20.

Nut 26 is provided to secure ball stud member 14 of tie rod end 10 within a tie rod arm of a steering knuckle (not shown). Nut 26 is conventional in the art.

Purgative zerk 28 provides a means for allowing removal of lubricant in bore 30. Purgative zerk 28 is disposed in bore 30 of socket member 12. Because bore 38 is in communication with bore 30, zerk 28 is also in communication with bore 30 and the lubricants within bore 30 used for lubrication of the friction surfaces of ball stud member 14 and bearing rings 16, 18. Purgative zerk 28 acts as a reversible valve. Zerk 28 prevents outside environmental contaminates from entering bore 30 of tie rod end 10 while allowing used, contaminated lubricant to be purged from tie rod end 10. Although a purgative zerk 28 is used in the illustrated embodiment, it should be understood that alternative structures could be used in place of zerk 28 such as a removable plug, or a valve capable of being opened by hand or by a tool.

Figure 3:
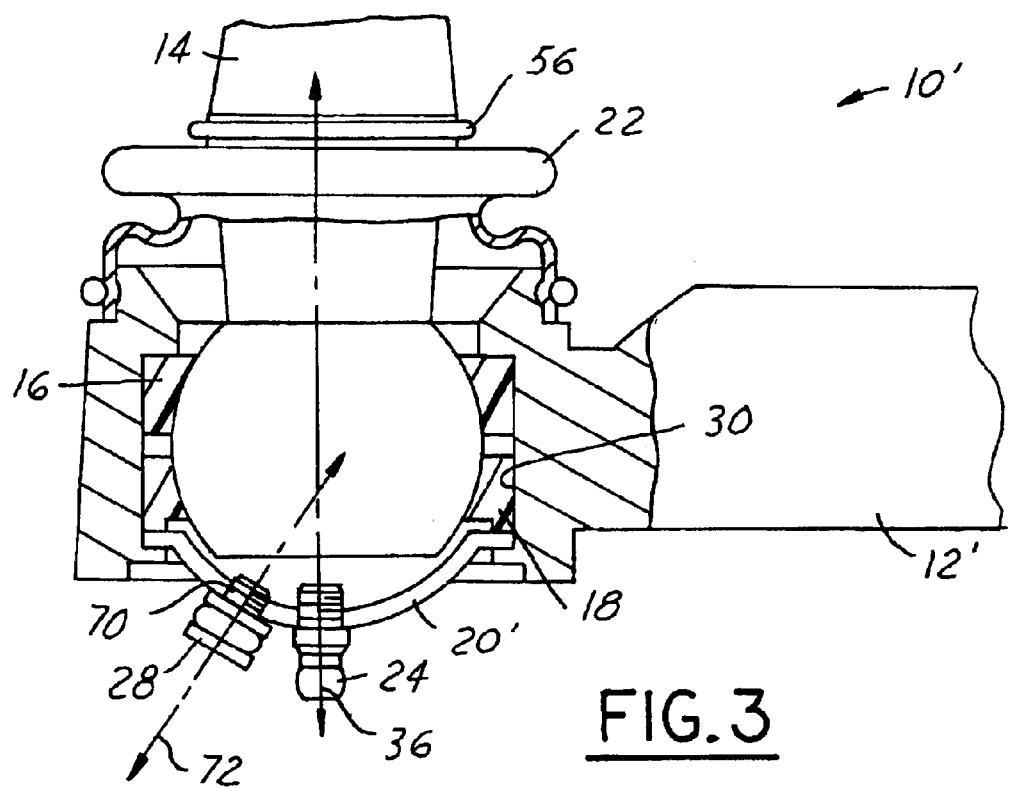
FIG. 3 is a sectional view of a second embodiment of a tie rod in accordance with the present invention.

FIG. 3 shows an alternative embodiment of a tie rod end 10' in accordance with the present invention. Tie rod end 10' is substantially similar to tie rod end 10. Accordingly, like reference numerals are used to identify identical or substantially similar elements and only differences relative to tie rod end 10 will be described hereinafter. In this embodiment, socket member 12' does not define another bore in communication with bore 30 and configured to receive zerk 28. Rather, zerk 28 is disposed in an aperture 70 in plug 20'. Aperture 70, and zerk 28, may be disposed about an axis 72 that intersects axis 36 of bore 30.

A tie rod end in accordance with the present invention represents a significant improvement as compared to tie rod ends known in the art. Conventional tie rod ends generally use one or more purge holes in the boot seal. As a result, conventional tie rod ends often allow contaminants to enter the bore in which the ball portion of the ball stud member is located thereby increasing friction and reducing the useful life of the tie rod end. The use and location of a purgative zerk or equivalent structure in the present invention enables used lubricants to be purged from tie rod end, but eliminates or reduces the amount of outside contamination that may enter the tie rod end.

While the invention has been particularly shown and described with reference to the preferred embodiments thereof, it is well understood by those skilled in the art that various changes and modification can be made in the invention without departing from the spirit and scope of the invention.

I claim:

1. A tie rod end, comprising:

a socket member defining a first bore proximate one end and a second bore in communication with said first bore;

a ball stud member including a ball portion disposed within said first bore and a stud extending from said first bore;

first and second bearing rings disposed within said first bore, said first and second bearing rings receiving said ball portion of said ball stud member; and, a purgative zerk disposed in said second bore, said purgative zerk allowing lubricant flowing between said ball stud member and said first and second bearing rings to be purged from said first bore.

2. The tie rod end of claim 1, further comprising a boot seal disposed about said ball stud member.

3. The tie rod end of claim 2, wherein said boot seal contains only one aperture through which said stud extends from said first bore.

4. The tie rod end of claim 1, wherein said first bore is disposed about a first axis and said second bore is disposed about a second axis perpendicular to said first axis.

5. A tie rod end, comprising:

a socket member defining a first bore proximate one end;

a ball stud member including a ball portion disposed within said first bore, and a stud extending from said first bore;

a plug disposed at one end of said first bore; and a purgative zerk disposed in said plug.

6. The tie rod end of claim 5, further comprising a boot seal disposed about said ball stud member.

7. The tie rod end of claim 6, wherein said boot seal contains only one aperture through which said stud extends from said first bore.

8. The tie rod end of claim 5, wherein said first bore is disposed about a first axis and said purgative zerk is disposed about a second axis, said second axis intersecting said first axis.

9. The tie rod end of claim 5, further comprising:

first and second bearing rings disposed within said first bore, said first and second bearing rings receiving said ball portion of said ball stud member wherein said purgative zerk allows lubricant flowing between said ball stud member and said first and second bearing rings to be purged from said first bore.

10. A tie rod end, comprising:

a socket member defining a first bore proximate one end and a second bore in communication with said first bore;

a ball stud member including a ball portion disposed within said first bore and a stud extending from said first bore;

first and second bearing rings disposed within said first bore, said first and second bearing rings receiving said ball portion of said ball stud member; and, means, disposed in said second bore, for allowing removal of lubricant flowing between said ball stud member and said first and second bearing rings in said first bore.

11. The tie rod end of claim 10, further comprising a boot seal disposed about said ball stud member.

12. The tie rod end of claim 11, wherein said boot seal contains only one aperture through which said stud extends from said first bore.

13. The tie rod end of claim 10, wherein said first bore is disposed about a first axis and said second bore is disposed about a second axis perpendicular to said first axis.

* * * * *